(12) United States Patent
Suzuki

(10) Patent No.: US 11,507,807 B2
(45) Date of Patent: Nov. 22, 2022

(54) AUDIO SIGNAL PROCESSING DEVICE, AUDIO SIGNAL PROCESSING METHOD, AND CONTROL PROGRAM

(71) Applicant: Panasonic Intellectual Property Management Co., Ltd., Osaka (JP)

(72) Inventor: Ryoji Suzuki, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 918 days.

(21) Appl. No.: 16/334,425

(22) PCT Filed: Sep. 22, 2017

(86) PCT No.: PCT/JP2017/034233
§ 371 (c)(1),
(2) Date: Mar. 19, 2019

(87) PCT Pub. No.: WO2018/062021
PCT Pub. Date: Apr. 5, 2018

(65) Prior Publication Data
US 2020/0090029 A1   Mar. 19, 2020

(30) Foreign Application Priority Data
Sep. 27, 2016  (JP) .................. JP2016-188854

(51) Int. Cl.
*G10L 25/18* (2013.01)
*G10L 25/30* (2013.01)
(Continued)

(52) U.S. Cl.
CPC ........... *G06N 3/063* (2013.01); *G06N 3/0454* (2013.01); *G06N 3/08* (2013.01); *G10L 25/18* (2013.01); *G10L 25/30* (2013.01)

(58) Field of Classification Search
CPC .......... G06N 3/063; G06N 3/08; G10L 25/30; G10L 25/18
See application file for complete search history.

(56) References Cited

U.S. PATENT DOCUMENTS 5,040,215 A * 8/1991 Amano ................. G10L 15/16
                                                          706/900
5,272,723 A   12/1993 Kimoto et al.
(Continued)

FOREIGN PATENT DOCUMENTS

JP          3-254223       11/1991
JP          9-244696       9/1997

OTHER PUBLICATIONS

Manganaro, G., Arena, P., & Fortuna, L. (1999). A One-Dimensional Discrete-Time CNN Chip for Audio Signal Processing. In Cellular Neural Networks (pp. 189-204). Springer, Berlin, Heidelberg.*

(Continued)

*Primary Examiner* — Bryan S Blankenagel
(74) *Attorney, Agent, or Firm* — McDermott Will & Emery LLP

(57) ABSTRACT

An audio signal processing device includes a neural network circuit that includes an input layer including input units, an intermediate layer, and an output layer including output units, an input section that executes simultaneous inputting of, at each of unit time intervals, each of pieces of unit data of consecutive sampling units in an input signal data string generated through sampling based on an audio signal string into each of the input units on a one-to-one basis, one of the pieces of unit data input into one of the input units at one of the unit time intervals being input into another of the input units at another of the unit time intervals in the simultaneous inputting at each of the unit time intervals, and an output section that outputs, in accordance with the simultaneous inputting over a plurality of the unit time intervals that are consecutive, a computation result at each of the unit time intervals, the computation result being based on pieces of (Continued)

data output from the output units at each of the unit time intervals.

8 Claims, 3 Drawing Sheets

(51) Int. Cl.
  *G06N 3/063* (2006.01)
  *G06N 3/04* (2006.01)
  *G06N 3/08* (2006.01)

(56) References Cited

U.S. PATENT DOCUMENTS

| | | | |
|---|---|---|---|
| 5,960,391 A | 9/1999 | Tateishi et al. | |
| 6,347,091 B1* | 2/2002 | Wallentin | H04W 28/18 370/464 |
| 8,868,221 B1* | 10/2014 | Mealy | G05B 13/027 706/14 |
| 2016/0342893 A1* | 11/2016 | Ross | G06N 5/04 |

OTHER PUBLICATIONS

International Search Report of PCT application No. PCT/JP2017/034233 dated Dec. 12, 2017.
The Extended European Search Report dated Sep. 26, 2019 for the related European Patent Application No. 17855975.3.
Han Kun et al: "Learning Spectral Mapping for Speech Dereverberation and Denoising", IEEE/ACM Transactions on Audio, Speech, and Language Processing, IEEE, USA, vol. 23, No. 6, Jun. 1, 2015 (Jun. 1, 2015), pp. 982-992, XP011578281, [retrieved Apr. 10, 2015].
Andrzej Czyzewski: "Learning Algorithms for Audio Signal Enhancement, Part 1: Neural Network Implementation for the Removal of Impulse Distortions", JAES vol. 45 Issue, Oct. 31, 1997 (Oct. 31, 1997), pp. 815-831, XP055442324, Retrieved from the Internet: URL:http://www.aes.org/e-lib/inst/download.cfm/7839.pdf?ID=7839 [retrieved on Jan. 18, 2018].

\* cited by examiner

AUDIO SIGNAL PROCESSING DEVICE, AUDIO SIGNAL PROCESSING METHOD, AND CONTROL PROGRAM

CROSS-REFERENCE TO RELATED APPLICATIONS

This application is a U.S. national stage application of the PCT International Application No. PCT/JP2017/034233 filed on Sep. 22, 2017, which claims the benefit of foreign priority of Japanese patent application No. 2016-188854 filed on Sep. 27, 2016, the contents all of which are incorporated herein by reference.

TECHNICAL FIELD

The present disclosure relates to an audio signal processing device, an audio signal processing method, and a control program that execute audio signal processing on audio signal data generated through sampling and the like based on an audio signal.

BACKGROUND ART

PTL 1 discloses an analog data transmission system that causes a neural network located at a receiver side to reconstruct a high-frequency component removed during transmission of analog data. Such an analog data transmission system includes the neural network that executes learning in advance in accordance with data characteristics and a synthesizer that synthesizes a narrowband signal received at the receiver side with a high-frequency signal reconstructed by the neural network.

CITATION LIST

Patent Literature

PTL 1: Unexamined Japanese Patent Publication No. H03-254223

SUMMARY

The present disclosure provides an audio signal processing device that is capable of reconstructing, with less noise and distortion, lost components for audio signal data generated with a high-frequency component lost due to sampling of an audio signal and a minute-amplitude component lost due to quantization.

The present disclosure further provides an audio signal processing method for executing the reconstruction with less noise and distortion for the audio signal data and a control program used by the audio signal processing device.

The audio signal processing device according to the present disclosure includes a neural network circuit that includes an input layer including a plurality of input units, an intermediate layer, and an output layer including a plurality of output units, an input section that executes simultaneous inputting of, at each of unit time intervals, each of pieces of unit data of a plurality of consecutive sampling units in an input signal data string generated through sampling based on an audio signal string into each of the plurality of input units on a one-to-one basis, one of the pieces of unit data input into one of the plurality of input units at one of the unit time intervals being input into another of the plurality of input units at another of the unit time intervals in the simultaneous inputting at each of the unit time intervals, and an output section that outputs, in accordance with the simultaneous inputting over a plurality of the unit time intervals that are consecutive, a computation result at each of the unit time intervals, the computation result being based on pieces of data output from the plurality of output units at each of the plurality of unit time intervals.

Furthermore, the audio signal processing method according to the present disclosure is an audio signal processing method for outputting an output signal data string in accordance with an input signal data string generated through sampling based on an audio signal string by using a neural network circuit that includes an input layer including a plurality of input units, an intermediate layer, and an output layer including a plurality of output units. The audio signal processing method includes executing simultaneous inputting of, at each of unit time intervals, each of pieces of unit data of a plurality of consecutive sampling units in the input signal data string into each of the plurality of input units on a one-to-one basis, one of the pieces of unit data input into one of the plurality of input units at one of the unit time intervals being input into another of the plurality of input units at another of the unit time intervals in the simultaneous inputting at each of the unit time intervals; and outputting, in accordance with the simultaneous inputting over a plurality of the unit time intervals that are consecutive, a computation result at each of the unit time intervals as an element of the output signal data string, the computation result being based on pieces of data output from the plurality of output units at each of the plurality of unit time intervals.

Furthermore, the control program according to the present disclosure causes a computer to execute audio signal processing for outputting an output signal data string in accordance with an input signal data string generated through sampling based on an audio signal string by using a neural network circuit that includes an input layer including a plurality of input units, an intermediate layer, and an output layer including a plurality of output units. The audio signal processing includes executing simultaneous inputting of, at each of unit time intervals, each of pieces of unit data of a plurality of consecutive sampling units in the input signal data string into each of the plurality of input units on a one-to-one basis, one of the pieces of unit data input into one of the plurality of input units at one of the unit time intervals being input into another of the plurality of input units at another of the unit time intervals in the simultaneous inputting at each of the unit time intervals; and outputting, in accordance with the simultaneous inputting over a plurality of the unit time intervals that are consecutive, a computation result at each of the unit time intervals as an element of the output signal data string, the computation result being based on pieces of data output from the plurality of output units at each of the plurality of unit time intervals.

The use of the audio signal processing device and the like according to the present disclosure makes it possible to reconstruct components for audio signal data lost due to sampling or the like. Furthermore, the reconstruction can be executed with less distortion and noise.

DESCRIPTION OF EMBODIMENT

Figure 1:
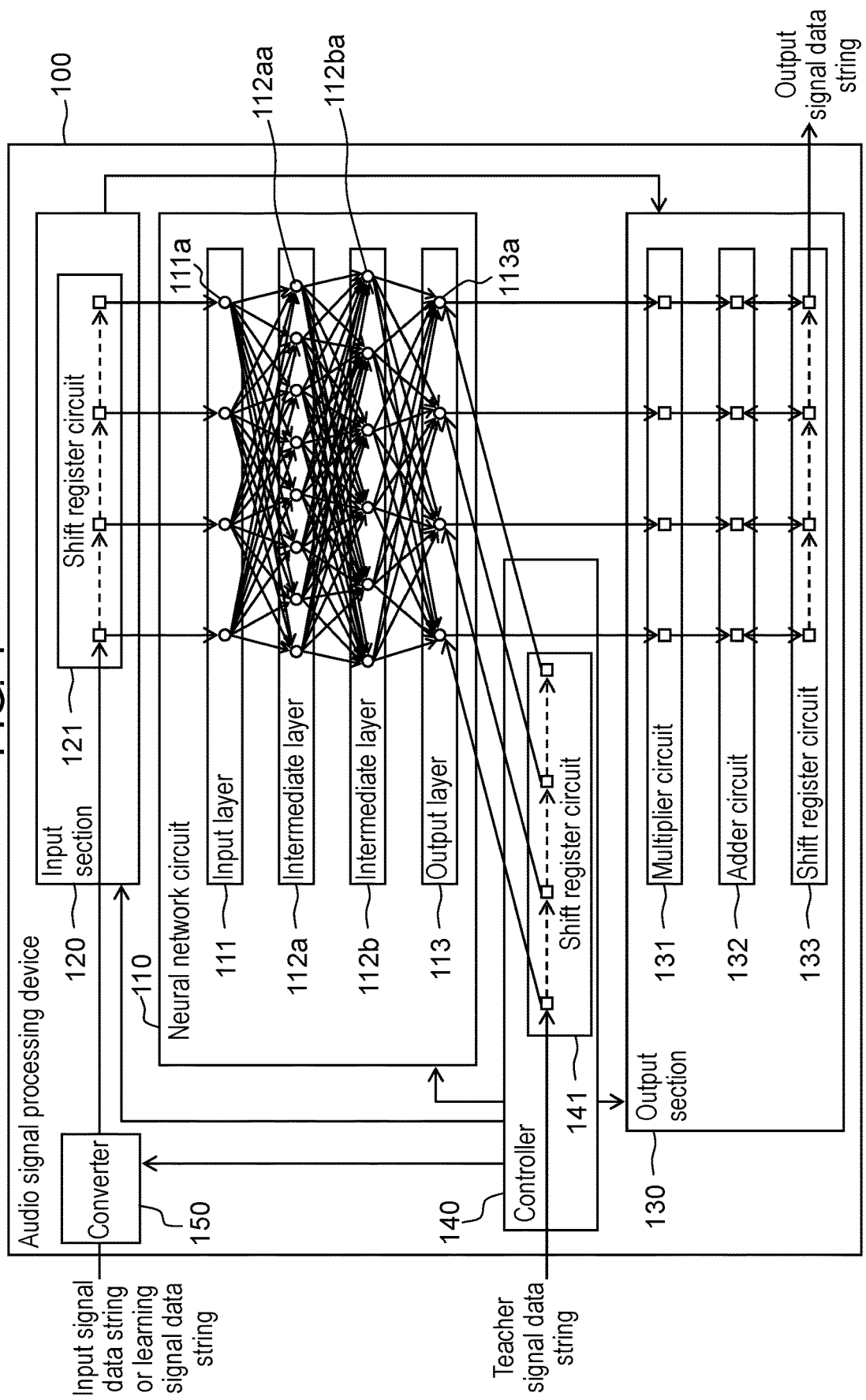
FIG. 1 is a block diagram schematically showing a configuration example of an audio signal processing device according to a first exemplary embodiment.

An object is to reconstruct, with less noise and distortion, lost components for audio signal data generated with a high-frequency component lost due to sampling and a minute-amplitude component lost due to quantization.

An audio signal processing device according to the present disclosure includes a neural network circuit that includes an input layer including a plurality of input units, an intermediate layer, and an output layer including a plurality of output units, an input section that executes simultaneous inputting of, at each of unit time intervals, each of pieces of unit data of a plurality of consecutive sampling units in an input signal data string generated through sampling based on an audio signal string into each of the plurality of input units on a one-to-one basis, one of the pieces of unit data input into one of the plurality of input units at one of the unit time intervals being input into another of the plurality of input units at another of the unit time intervals in the simultaneous inputting at each of the unit time intervals, and an output section that outputs, in accordance with the simultaneous inputting over a plurality of the unit time intervals that are consecutive, a computation result at each of the unit time intervals, the computation result being based on pieces of data output from the plurality of output units at each of the plurality of unit time intervals.

This configuration causes the output layer of the neural network circuit to output data reflecting one piece of unit data input into the input layer of the neural network circuit a plurality of times over a plurality of unit time intervals and computation using each piece of data over the plurality of unit time intervals to be executed in the audio signal processing device. Therefore, output with less distortion and noise may be acquired by the audio signal processing device. Accordingly, in the audio signal processing device with the neural network circuit already learned, when audio signal data generated with a high-frequency component lost due to sampling of an audio signal and a minute-amplitude component lost due to quantization is fed as the input signal data string, data with the lost components reconstructed may be acquired with less distortion and noise.

For example, the input units of the input layer and the output units of the output layer may be both N in number (N is an integer equal to or greater than two). The input section may include a first shift register circuit capable of holding N pieces of unit data as an input unit data string. The first shift register circuit may fetch M (M is an integer equal to or greater than one and less than N) pieces of unit data from the input signal data string into the input unit data string at each of the unit time intervals, shift the input unit data string by an amount equivalent to the M pieces of unit data at each of the unit time intervals, and simultaneously input N pieces of unit data in the input unit data string into N inputs units at each of the unit time intervals. The output section may include a second shift register capable of holding N pieces of unit data as an output unit data string, a multiplier circuit that multiplies respective pieces of data output from the N output units by coefficients, and an adder circuit that adds a result of the multiplication from the multiplier circuit and the output unit data string held in the second shift register circuit together and updates N pieces of unit data in the second shift register circuit with a result of the addition. The second shift register circuit may output M pieces of unit data from the output unit data string at each of the unit time intervals, shift the output unit data string by an amount equivalent to M pieces of unit data at each of the unit time intervals, and hold the result of the addition as the output unit data string, the result of the addition being acquired by sending N pieces of unit data in the output unit data string to the adder circuit at each of the unit time intervals. Furthermore, for example, M may be equal to one, and each of the coefficients by which the multiplier circuit multiplies respective pieces of data output from N output units may be equal to 1/N.

This configuration allows the audio signal processing device to, for example, successively input the same unit data into the input layer of the neural network circuit by causing the first shift register circuit to shift data. Furthermore, in the audio signal processing device, cumulative multiplication using pieces of data output from the neural network circuit over a plurality of unit time intervals are executed by the second shift register circuit that shifts data in synchronization with the first shift register circuit, the multiplier circuit, and the adder circuit, which makes it possible to acquire an output signal data string with less distortion and noise.

For example, the audio signal processing device may further include a controller that executes control to cause the neural network circuit to execute learning. The controller may include a third shift register circuit capable of holding N pieces of unit data as a teacher unit data string. The controller may control the third shift register circuit to cause the third shift register circuit to fetch, into the teacher unit data string at each of the unit time intervals, M pieces of unit data from a teacher signal data string resulting from sampling, at a first sampling frequency, and quantizing, with a first quantization bit number, an audio signal string for learning, shift the teacher unit data string by an amount equivalent to M pieces of unit data at each of the unit time intervals, and feed N pieces of unit data in the supervisory unit data string to N output units at each of the unit time intervals. The controller may execute control to cause the first shift register circuit to handle, as the input signal data string, a learning signal data string acquired through sampling at a second sampling frequency lower than the first sampling frequency and quantizing with a second quantization bit number less than the first quantization bit number based on the audio signal string for learning, and conversion to be identical in sampling frequency and quantization bit number to the teacher signal data string. In this manner, the controller may cause the neural network circuit to execute learning.

This configuration allows the audio signal processing device to cause the neural network circuit to execute learning by feeding the learning signal data string and the teacher signal data string based on the audio signal string for learning to the neural network circuit.

For example, the neural network circuit may be a stacked autoencoder in which autoencoders are stacked.

This configuration allows the audio signal processing device to include a plurality of intermediate layers of the neural network circuit and to more suitably reconstruct a high-frequency component and a minute-amplitude component that have been lost due to, for example, sampling of an audio signal.

For example, each unit of the intermediate layer may execute nonlinear processing.

This configuration allows the audio signal processing device to suitably reconstruct a high-frequency component and a minute-amplitude component that have been lost due to, for example, sampling of the audio signal. Furthermore, in the output section, distortion that likely occurs through the nonlinear processing may be reduced.

An audio signal processing method according to the present disclosure is an audio signal processing method for outputting an output signal data string in accordance with an input signal data string generated through sampling based on an audio signal string by using a neural network circuit that includes an input layer including a plurality of input units, an intermediate layer, and an output layer including a plurality of output units. The audio signal processing method includes executing simultaneous inputting of, at each of unit time intervals, each of pieces of unit data of a plurality of consecutive sampling units in the input signal data string into each of the plurality of input units on a one-to-one basis, one of the pieces of unit data input into one of the input units at one of the unit time intervals being input into another of the input units at another of the unit time intervals in the simultaneous inputting at each of the unit time intervals; and outputting, in accordance with the simultaneous inputting over a plurality of the unit time intervals that are consecutive, a computation result at each of the unit time intervals as an element of the output signal data string, the computation result being based on pieces of data output from the plurality of output units at each of the plurality of unit time intervals.

This configuration causes the output layer of the neural network circuit to output data reflecting one piece of unit data input into the input layer of the neural network circuit a plurality of times over a plurality of unit time intervals and computation using each piece of data over the plurality of unit time intervals to be executed in the audio signal processing device that execute the audio signal processing method. Therefore, output with less distortion and noise may be acquired by the audio signal processing device. Accordingly, in the audio signal processing device with the neural network circuit already learned, when audio signal data generated with a high-frequency component lost due to sampling of an audio signal and a minute-amplitude component lost due to quantization is fed as the input signal data string, data with the lost components reconstructed may be acquired with less distortion and noise.

For example, according to the audio signal processing method, to cause the neural network circuit to execute learning, each of pieces of unit data of the plurality of consecutive sampling units in the teacher signal data string resulting from sampling, at the first sampling frequency, and quantizing, with the first quantization bit number, the audio signal string for learning may be simultaneously fed, at each of the unit time intervals, to each of the plurality of output units on a one-to-one basis. The simultaneous feed at each of the unit time intervals may be executed such that one of the pieces of unit data fed to one of the output units at one of the unit time intervals is fed to another of the output unit at another of the unit time intervals. Each of pieces of unit data of the plurality of consecutive sampling units in the learning signal data string may be simultaneously input into each of the plurality of inputs units on a one-to-one basis, at each of the unit time intervals, the learning signal data string being acquired through sampling at the second sampling frequency lower than the first sampling frequency and quantizing with the second quantization bit number less than the first quantization bit number based on the audio signal string for learning, and conversion to be identical in sampling frequency and quantization bit number to the teacher signal data string. The simultaneous inputting at each of the unit time intervals may be executed such that one of the pieces of unit data input into one of the input units at one of the unit time intervals is input into another of the input units at another of the unit time intervals.

This configuration causes the learning signal data string and the teacher signal data string based on the audio signal string for learning to be fed to the neural network circuit and causes the neural network circuit to execute learning to output, with respect to the inputting of the input signal data string generated with a high-frequency component lost due to sampling and a minute-amplitude component lost due to quantization, the output signal data string that has the lost high-frequency component and minute-amplitude component reconstructed.

For example, the audio signal string for learning may be a frequency sweep signal or an amplitude sweep signal.

This configuration allows the neural network circuit to suitably reconstruct components lost due to, for example, sampling with respect to input signal data strings based on various audio signal strings.

Furthermore, a control program according to the present disclosure causes a computer to execute audio signal processing for outputting an output signal data string in accordance with an input signal data string generated through sampling based on an audio signal string by using a neural network circuit that includes an input layer including a plurality of input units, an intermediate layer, and an output layer including a plurality of output units. The audio signal processing includes executing simultaneous inputting of, at each of unit time intervals, each of pieces of unit data of a plurality of consecutive sampling units in the input signal data string into each of the plurality of input units on a one-to-one basis, one of the pieces of unit data input into one of the input units at one of the unit time intervals being input into another of the input units at another of the unit time intervals in the simultaneous inputting at each of the unit time intervals; and outputting, in accordance with the simultaneous inputting over a plurality of the unit time intervals that are consecutive, a computation result at the each of unit time intervals as an element of the output signal data string, the computation result being based on pieces of data output from the plurality of output units at each of the plurality of unit time intervals.

The audio signal processing device in which this control program is installed and executed may output, in accordance with the input signal data string, the output signal data string that has a component for the input signal data string lost due to sampling or the like reconstructed with less distortion and noise.

These general or specific aspects may be implemented by a device, a system, a method, an integrated circuit, a computer program, or a computer-readable recording medium, or may be implemented by any one of a plurality of combinations of the device, the system, the method, the integrated circuit, the computer program, and the recording medium.

Exemplary embodiments will now be described in detail with reference to the drawings where appropriate. However, the description may not include details beyond necessity. For example, already well-known matters may not be described in detail, and substantially same configurations may not be described repeatedly. This is to avoid unnecessary redundancy in the following description and to facilitate understanding of those skilled in the art.

The accompanying drawings and the following exemplary embodiments are provided for those skilled in the art to fully understand the present disclosure, and only indicate an example of the present disclosure. Numerical values, shapes, materials, constituent elements, arrangement positions and connection modes of the constituent elements, steps (processes), and order of the steps illustrated in the following exemplary embodiments are merely examples, and therefore are not intended to limit the scope of the claims. Among constituent elements in the following exemplary embodiments, a constituent element that is not described in an independent claim indicating a top concept is a constituent element that can be added to the constituent element described in the independent claim in any way.

Each of the drawings is not exactly illustrated, but some of the drawings are schematic diagrams simplified as appropriate for the purpose of illustrating the present disclosure in an easily understood manner. In each of the drawings, a substantially identical constituent elements are given with the same reference numerals, and descriptions of such constituent elements may be omitted or simplified.

First Exemplary Embodiment

In a first exemplary embodiment, a description will be given of audio signal processing device 100 that executes an audio signal processing method for reconstructing lost components with less distortion and noise for an audio signal data string generated with a high-frequency component lost due to sampling of an audio signal string and a minute-amplitude component lost due to quantization.

The first exemplary embodiment will be described below with reference to the drawings.

[1-1. Configuration]

FIG. 1 is a block diagram schematically showing a configuration example of audio signal processing device 100 according to the first exemplary embodiment.

Audio signal processing device 100, as shown in FIG. 1, includes neural network circuit 110, input section 120, output section 130, controller 140, and converter 150.

Audio signal processing device 100 is a device configured to output an output signal data string resulting from executing, on an input signal data string, audio signal processing for reconstructing a high-frequency component and a minute-amplitude component based on an audio signal data string (input signal data string) to be input by using neural network circuit 110.

Neural network circuit 110 executes learning with a teacher signal data string. The output signal data string and the teacher signal data string each correspond to a data string that is identical in structure (format) to digital audio signal data resulting from sampling, at a first sampling frequency that is relatively high (for example, 88.2 kHz) and quantizing, with a first quantization bit number that is relatively large (for example, 24 bits), an analog audio signal string.

An input signal data string input into input section 120 is a data string output from converter 150. An input signal data string input into converter 150 corresponds to digital audio signal data resulting from sampling, at a second sampling frequency (for example, 44.1 kHz) lower than the first sampling frequency, and quantizing, with a second quantization bit number (for example, 16 bits) less than the first quantization bit number, an analog audio signal string. Converter 150 converts the digital audio signal data into a data string that is identical in sampling frequency and quantization bit number to the above-described output signal data string and the teacher signal data string. The data string thus acquired corresponds to the input signal data string to be input into input section 120. Note that the conversion executed by converter 150 is merely nominal conversion (expansion of bit number) including conversion for making the sampling frequency of the input signal data string identical to the sampling frequency of the output signal data string and the teacher signal data string that is different from the sampling frequency of the input signal data string and conversion for making the quantization bit number of the input signal data string identical to the quantization bit number of the output signal data string and the teacher signal data string that is different from the quantization bit number of the input signal data string. Specifically, signal components are not substantially changed by the conversion executed by converter 150 (that is, this conversion does not add a high-frequency component and a minute-amplitude component to the input signal data string).

Note that the input signal data string to be input into converter 150 corresponds to an audio signal data string that is identical in quality to, for example, an audio signal data string recorded in a music compact disc (CD) (a data string sampled at a sampling frequency of 44.1 kHz and quantized with a quantization bit number of 16 bits). Executing the above-described conversion on this input signal data string in converter 150 generates the input signal data string to be input into input section 120.

Note that the analog audio signal string corresponds to a time-series signal along a time axis, and successive sampling or the like of the analog audio signal string is executed along the time axis. The input signal data string to be input into converter 150 is a time-series data string, as with the analog audio signal string based on which the input signal data string is generated.

Audio signal processing device 100 is a device that includes electronic circuits such as a shift register circuit and a neural network circuit (for example, semiconductor integrated circuits). Such electronic circuits may be configured with a memory, a processor (a microprocessor), and the like.

Examples of the memory include a read only memory (ROM) that prestores a program and data and a random access memory (RAM) used to store data and the like during execution of the program. Examples of the memory may include a non-volatile memory. The memory may prestore, for example, a control program for executing audio signal processing according to the audio signal processing method and a setting value used by the control program.

The processor executes the control program to control each unit of audio signal processing device 100 for the audio signal processing. The audio signal processing includes reconstruction processing for reconstructing, by using neural network circuit 110, a high-frequency component or the like based on the input signal data string and learning control processing for causing neural network circuit 110 to execute learning to suitably execute the reconstruction.

The memory may be used to temporarily store each value used when the control program is executed by the processor.

Note that neural network circuit 110 may be configured with a processor that executes a program and a memory.

Next, descriptions will be given of neural network circuit 110, input section 120, output section 130, and controller 140 that serve as constituent elements for the audio signal processing of audio signal processing device 100 shown in FIG. 1.

[1-1-1. Neural Network Circuit]

Neural network circuit 110 includes input layer 111, two intermediate layers 112a and 112b, and output layer 113.

Input layer 111 includes N (for example, 256 or 1024) units (input units 111a). Similarly, output layer 113 includes N (for example, 256, or 1024) units (output units 113a). In the present exemplary embodiment, a configuration example where neural network circuit 110 includes two intermediate layers including intermediate layer 112a and intermediate layer 112b is described. However, the present disclosure is by no means limited to this configuration example. Neural network circuit 110 may include, for example, one intermediate layer, or three or more intermediate layers.

Intermediate layer 112a and intermediate layer 112b each include any number of units. In FIG. 1, each input unit 111a of input layer 111, each output unit 113a of output layer 113, each unit 112aa of intermediate layer 112a, and each unit 112ba of intermediate layer 112b are represented by circles. Furthermore, in FIG. 1, respective numbers of units are not shown for convenience.

Data resulting from normalizing n-bit (for example, 16-bit) data in a range of $-1 \leq$(input signal data)$<+1$ and converting into k-bit (for example, 24-bit) data is input into each of N input units 111a of input layer 111. Then, each input unit 111a of input layer 111 outputs the k-bit data to each unit 112aa of intermediate layer 112a as an output destination. This is for, in a case where a nonlinear function used for an activation function operation is, for example, tanh (a hyperbolic tangent function), making a range of the data identical to a range of an output value from tanh. For example, this n-bit data is fixed point data, and this k-bit data is fixed point data or floating point data. In this case, the data normalization can be made by, for example, moving the decimal point. Furthermore, meeting k>n can prevent cancellation of significant digits from occurring during computation.

Note that the processing for converting the n-bit data to the k-bit data may be executed by, for example, input section 120.

The k-bit data output from each of N input units 111a of input layer 111 is input into each unit 112aa of intermediate layer 112a. Each unit 112aa of intermediate layer 112a multiplies each piece of the input data by a weight and calculates k-bit data as a computation result from the activation function based on a sum of the pieces of the input data thus weighted. Then, each unit 112aa of intermediate layer 112a outputs the k-bit data to each unit 112ba of intermediate layer 112b as an output destination. This weight (that is, a weight connecting units between layers) may vary with learning. Furthermore, this weight may be multiplied to the k-bit data between input unit 111a of input layer 111 and unit 112aa in intermediate layer 112a. Alternatively, the k-bit data multiplied by this weight may be output from input unit 111a of input layer 111. Furthermore, this activation function is a nonlinear function such as tanh (a hyperbolic tangent function). Accordingly, each unit 112aa of intermediate layer 112a can execute nonlinear processing as an operation of the activation function.

The k-bit data output from each unit 112aa of intermediate layer 112a is input into each unit 112ba of intermediate layer 112b. Each unit 112ba of intermediate layer 112b multiplies each piece of the input data by a weight and calculates k-bit data as a computation result from the activation function based on a sum of the pieces of the input data thus weighted. Then, each unit 112ba of intermediate layer 112b outputs the k-bit data to each output unit 113a of output layer 113 as an output destination. This weight may vary with learning. Furthermore, this weight may be multiplied to the k-bit data between unit 112aa of intermediate layer 112a and unit 112ba of intermediate layer 112b. Alternatively, the k-bit data multiplied by this weight may be output from unit 112aa of intermediate layer 112a. Furthermore, as with the activation function used by each unit 112aa of intermediate layer 112a, this activation function is, for example, a nonlinear function such as tanh (a hyperbolic tangent function). Accordingly, each unit 112ba of intermediate layer 112b can execute nonlinear processing as an operation of the activation function.

The k-bit data output from each unit 112ba of intermediate layer 112b is input into each of N output units 113a of output layer 113. Each output unit 113a of output layer 113 multiplies each piece of the input data by a weight and calculates k-bit data as a computation based on a sum of the pieces of the input data thus weighted. Then, each of N output units 113a of output layer 113 outputs the k-bit data thus calculated. This weight may vary with learning. Furthermore, this weight may be multiplied to the k-bit data between unit 112ba of intermediate layer 112b and output unit 113a of output layer 113. Alternatively, the k-bit data multiplied by this weight may be output from unit 112ba of intermediate layer 112b.

Neural network circuit 110 is a stacked autoencoder in which autoencoders are stacked. For learning of neural network circuit 110, a pre-learning method is used in which unsupervised learning is executed in an autoencoder corresponding to intermediate layer 112a adjacent to input layer 111, and the same learning is sequentially executed in a subsequent intermediate layer to accumulate better weights. Furthermore, in neural network circuit 110, backpropagation is used for supervised learning. An initial value of a weight connecting units between layers is not randomly set, but is set through the pre-learning by a stacked autoencoder, which may solve the vanishing gradient problem in which the weight is prevented from being updated due to that errors are not propagated in the backpropagation.

[1-1-2. Input Section]

Input section 120 is capable of successively acquiring and holding each piece of unit data of a sampling unit that is an element of the input signal data string and inputting each piece of unit data into each input unit 111a of input layer 111 of neural network circuit 110. The sampling unit is a unit quantity of sampling at a first sampling frequency (for example, 88.2 kHz), and the unit data is k-bit data (data with a first quantization bit number such as 24-bit data).

Input section 120 causes shift register circuit 121 to execute simultaneous inputting of each of a plurality of (N) consecutive pieces of unit data in the input signal data string into each of a plurality of (N) input units 111a of input layer 111 at each of unit time intervals T on a one-to-one basis. Then, input section 120 executes the simultaneous inputting at each of unit time intervals T such that one of the pieces of unit data input into one of input units 111a (for example, input unit 111a(x)) at one of unit time intervals T (for example, unit time interval T(X)) is input into another of input units 111a (for example, input unit 111a(x+1) immediately after input unit 111a(x)) at another of unit time intervals T (for example, unit time interval T(X+1) immediately after unit time interval T(X)). At this time, input section 120 inputs unit data newly fetched into shift register circuit 121 into first input unit 111a (for example, input unit 111a(1)). Note that the above-described operation example is an example where M is equal to 1, and X is any integer that meets $1 \leq x \leq (N-1)$.

Unit time interval T is a certain time that is counted by a clock generator or a counter (not shown) for synchronizing processing of each unit of audio signal processing device 100, and a length of unit time interval T can be optionally determined. For example, unit time interval T corresponds to one cycle of a clock signal generated by the clock generator. Note that this unit time interval T is used for synchronizing processing of each unit of audio signal processing device 100, and as long as the synchronization is ensured, unit time interval T may change in length every lapse of unit time interval T.

Specifically, input section 120 includes shift register circuit 121 (a first shift register circuit) capable of holding N pieces of unit data as the input unit data string. Shift register circuit 121 fetches M (M is an integer equal to or greater than one and less than N) pieces of unit data from the input signal data string into the input unit data string at each of unit time intervals T and shifts the input unit data string by an amount equivalent to M pieces of unit data at each of unit time intervals T. Then, shift register circuit 121 executes simultaneous inputting of N pieces of unit data in the input unit data string into N input units 111a of input layer 111 at each of unit time intervals T. M is equal to one, for example. The input unit data string is time-series data corresponding to the input signal data string based on time-series audio signal.

[1-1-3. Output Section]

Output section 130 is capable of executing computation on data output from neural network circuit 110 in accordance with the input signal data string to reduce distortion and noise and outputting an output signal data string corresponding to time-series data resulting from the computation. Specifically, in accordance with the simultaneous inputting by input section 120 into input units 111a over a plurality of unit time intervals T that are consecutive, output section 130 outputs, at each of unit time intervals T, the computation result based on pieces of data output from the plurality of (N) output units 113a at each of the pluralities of unit time intervals T.

Specifically, output section 130 includes multiplier circuit 131, adder circuit 132, and shift register circuit 133 (a second shift register circuit) capable of holding N pieces of unit data (k-bit data) as the output unit data string.

Multiplier circuit 131 multiplies respective pieces of data output from N output units 113a of output layer 113 by coefficients. A sum of the coefficients by which data is multiplied at each of a plurality of unit time intervals T is equal to one. For example, when M is equal to one, each of the coefficients by which multiplier circuit 131 multiplies respective pieces of k-bit data output from N output units 113a is equal to 1/N, for example.

Adder circuit 132 adds, at each of unit time intervals T, a result of the multiplication of each piece of k-bit data output from multiplier circuit 131 and each piece of unit data in the output unit data string (N pieces of unit data) held in shift register circuit 133 together for each piece of k-bit data. Then, adder circuit 132 updates N pieces of unit data ([[n-bit]]k-bit data) in shift register circuit 133 with a result of the addition.

Shift register circuit 133 fetches, at each of unit time intervals T, M pieces of unit data of which initial value is zero. Then, shift register circuit 133 outputs M pieces of unit data from the output unit data string at each of unit time intervals T and shifts the output unit data string by an amount equivalent to M pieces of unit data at each of unit time intervals T. Then, shift register circuit 133 holds, as the output unit data string, the result of the addition acquired by sending N pieces of unit data in the output unit data string to adder circuit 132 at each of unit time intervals T. The output unit data string is a time-series data string for generating a time-series output signal data string in accordance with a time-series input unit data string in shift register circuit 121. A string of M pieces of unit data output from shift register circuit 133 at each of unit time intervals T is an output signal data string that corresponds to the input signal data string and has a lost high-frequency component and minute-amplitude component reconstructed.

[1-1-4. Controller]

Controller 140 is capable of executing control to cause neural network circuit 110 to execute learning (learning control processing and the like). After causing neural network circuit 110 to execute learning, controller 140 starts reconstruction processing by causing learned neural network circuit 110 to execute computation.

Specifically, controller 140 causes neural network circuit 110 to execute unsupervised learning with an autoencoder. Furthermore, to cause neural network circuit 110 to execute supervised learning, controller 140 includes shift register circuit 141 (a third shift register circuit) capable of holding N pieces of unit data as a teacher unit data string. Then, controller 140 controls shift register circuit 141 as follows. Specifically, shift register circuit 141 fetches, from a teacher signal data string resulting from sampling, at the first sampling frequency (for example, 88.2 kHz), and quantizing, with the first quantization bit number (for example, 24 bits), an audio signal string for learning, M pieces of unit data into the teacher unit data string at each of unit time intervals T, shifts the teacher unit data string by an amount equivalent to M pieces of unit data at each of unit time intervals T, and feeds N pieces of unit data in the teacher unit data string to N output units 113a of output layer 113 at each of unit time intervals T. Controller 140 controls shift register circuit 141 as described above. Note that the audio signal string for learning is an analog audio signal string or a digital audio signal string used for learning of neural network circuit 110.

The audio signal string for learning may be formed of, for example, a frequency sweep signal or an amplitude sweep signal, or a frequency and amplitude sweep signal. The frequency sweep signal is an audio signal that discretely or exhaustively covers an audible frequency range by changing a frequency according to a lapse of time and contains at least three different frequencies. Furthermore, the amplitude sweep signal is an audio signal that discretely or exhaustively contains various amplitudes that result from changing an amplitude according to a lapse of time and can be regarded as a signal waveform and contains at least three different amplitudes. Note that the audio signal string for learning need not be the frequency sweep signal nor the amplitude sweep signal. The audio signal string for learning may be, for example, a music audio signal string.

Moreover, controller 140 controls converter 150 and input section 120 as follows. Specifically, controller 140 causes shift register circuit 121 to handle, as the input signal data string, a learning signal data string acquired through conversion, executed by converter 150, of a data string to be identical in sampling frequency and quantization bit number to the teacher signal data string, the data string resulting from sampling, at the second sampling frequency (for example, 44.1 kHz), and quantizing, with the second quantization bit number (for example, 16 bits), the audio signal string for learning. Controller 140 controls converter 150 and input section 120 as described above.

Accordingly, the learning signal data signal based on the audio signal string for learning is fed to input layer 111 of neural network circuit 110, and the teacher signal data string based on the audio signal string for learning is fed to output layer 113. In this manner, controller 140 causes neural network circuit 110 to execute supervised learning using the backpropagation.

[1-2. Operation]

A description will be given below of an operation of audio signal processing device 100 configured as described above.

Audio signal processing device 100 executes the learning control processing and the reconstruction processing as audio signal processing for the audio signal processing method.

[1-2-1. Learning Control Processing]

In the learning control processing, a teacher signal data string and a learning signal data string that are generated based on a common audio signal string for learning are used. The teacher signal data string corresponds to a data string that results from sampling, at a relatively high sampling frequency (for example, 88.2 kHz) and quantizing, with a relatively large quantization bit number (for example, 24 bits), the audio signal string for learning and contains a relatively high frequency component (a high-frequency component) and a relatively small amplitude component (a minute-amplitude component). In contrast, the learning signal data string corresponds to a data string that results from sampling, a relatively low sampling frequency (for example, 44.1 kHz) and quantizing, with a relatively small quantization bit number (for example, 16 bits), the audio signal string for learning and have lost, during the generation thereof, the high-frequency component and the minute-amplitude component that are contained in the teacher signal data string. The audio signal string for learning is a time-series signal along a time axis. The learning signal data string and the teacher signal data string are time-series data strings, as with the audio signal string for learning based on which the learning signal data string and the teacher signal data string are generated.

Figure 2:
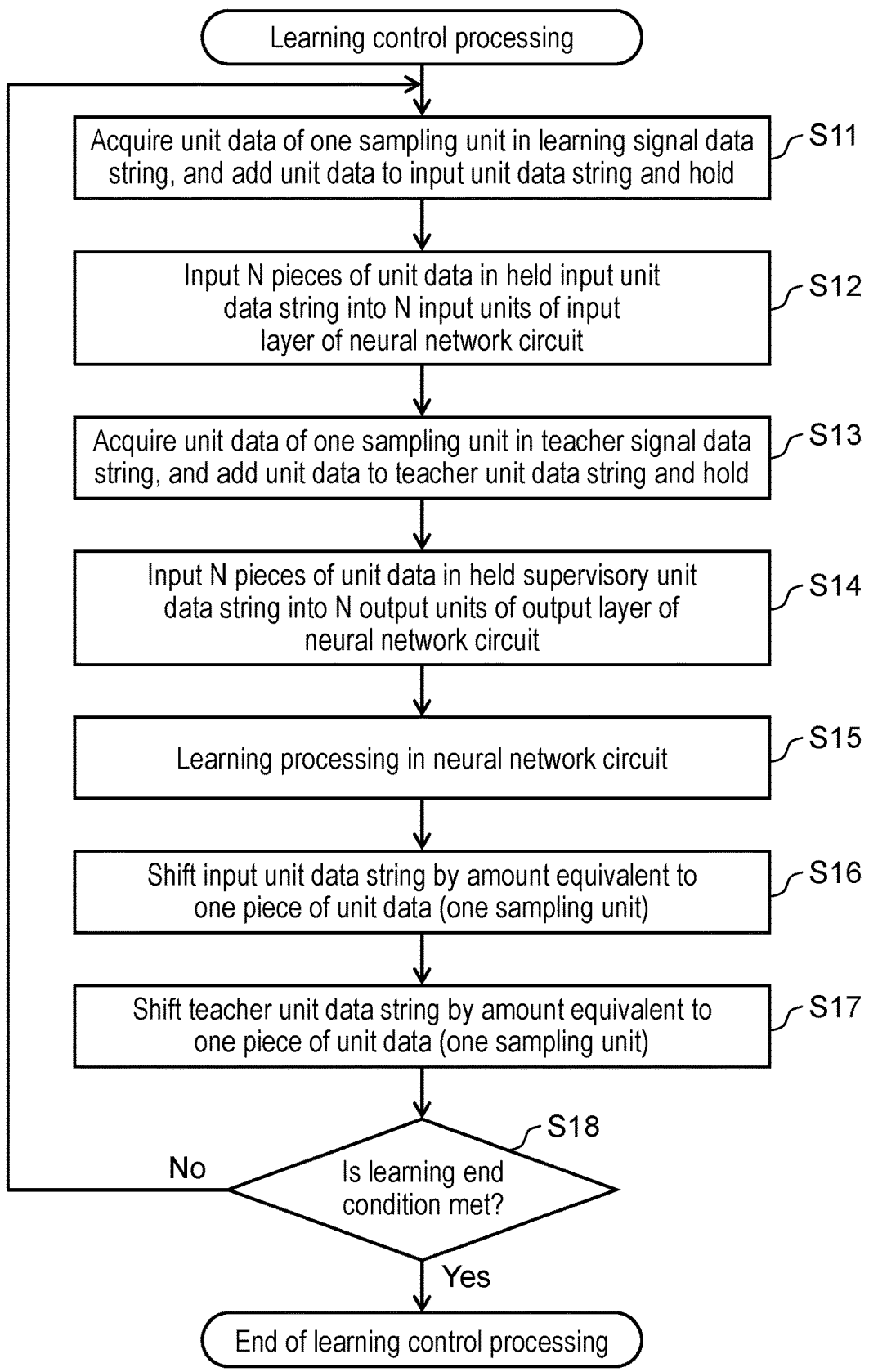
FIG. 2 is a flowchart showing an example of learning control processing executed by the audio signal processing device according to the first exemplary embodiment.

FIG. 2 is a flowchart showing an example of the learning control processing executed by audio signal processing device 100 according to the first exemplary embodiment. A description will be given below of the learning control processing according to the present exemplary embodiment with reference to FIG. 2.

Input section 120 controlled by controller 140 of audio signal processing device 100 acquires unit data ([[n-bit]]k-bit data) of one sampling unit in the learning signal data string via converter 150. Then, input section 120 adds the unit data thus acquired to an input unit data string in shift register circuit 121 to hold the unit data (step S11).

Input section 120 inputs each of N pieces of unit data in the input unit data string held in shift register circuit 121 into each of N input units 111a of input layer 111 of neural network circuit 110 on a one-to-one basis (step S12). This configuration causes each of N pieces of unit data acquired last (N pieces of unit data in an order opposite to the acquisition order) in the learning signal data string acquired by input section 120 to be simultaneously input into N input units 111a of input layer 111.

Controller 140 acquires unit data ([[n-bit]]k-bit data) of one sampling unit in the teacher signal data string and adds the unit data thus acquired to the teacher unit data string in shift register circuit 141 to hold the unit data (step S13).

Controller 140 inputs the unit data into each shift register circuit in synchronization with input section 120. Specifically, the unit data in the teacher signal data string that is acquired and input into shift register circuit 141 by controller 140 in step S13 is data that is generated based on an audio signal string for learning that is the same as the audio signal string for learning based on which unit data in the learning signal data string is generated, the unit data being acquired and input into shift register circuit 121 by input section 120 in step S11.

Controller 140 feeds (inputs) each of N pieces of unit data in the teacher unit data string held in shift register circuit 141 to each of N output units 113a of output layer 113 of neural network circuit 110 on a one-to-one basis (step S14). This configuration causes each of N pieces of unit data acquired last (N pieces of unit data in an order opposite to the acquisition order) in the teacher signal data string acquired by controller 140 to be simultaneously input into N output units 113a of output layer 113.

Controller 140 causes neural network circuit 110 to execute learning in accordance with the backpropagation or the like based on data fed into input layer 111 and data fed into output layer 113 (step S15).

Learning or the like in accordance with the backpropagation that is typically used is applicable to this learning; thus, a detailed description of the learning will be omitted.

Input section 120 controlled by controller 140 shifts data (the input unit data string containing N pieces of unit data) held in shift register circuit 121 by an amount equivalent to one piece of unit data (one sampling unit) (step S16).

Controller 140 shifts data (the teacher unit data string containing N pieces of unit data) held in shift register circuit 141 by an amount equivalent to one piece of unit data (one sampling unit) (step S17).

Controller 140 determines whether a learning end condition is met (step S18). The learning end condition is, for example, completion of all processing on the teacher signal data string.

In step S18, in a case where controller 140 determines that the learning end condition is met (Yes in step S18), audio signal processing device 100 terminates the learning control processing.

In step S18, in a case where controller 140 determines that the learning end condition is not met (No in step S18), audio signal processing device 100 repeats steps S11 to S17 until the learning end condition is met.

Note that FIG. 2 only shows an example of procedures for the learning control processing. An execution order of the procedures for the learning control processing may be changed, and a plurality of the procedures may be executed in parallel.

In the learning control processing for causing neural network circuit 110 to execute learning, controller 140 of audio signal processing device 100 causes shift register circuit 141 to simultaneously feed, at each of unit time intervals T, each of a plurality of consecutive pieces of unit data in the teacher signal data string to each of N output units 113a of output layer 113 on a one-to-one basis. Then, controller 140 executes the simultaneous feed at each of unit time intervals T such that one of the pieces of unit data input into one of output units 113a (for example, output unit 113a(x)) at one of unit time intervals T (for example, unit time interval T(X)) is fed to another of output units 113a (for example, output unit 113a(x+1) immediately after output unit 113a(x)) at another of unit time intervals T (for example, unit time interval T(X+1) immediately after unit time interval T(X)). At this time, controller 140 feeds unit data newly fetched into shift register circuit 141 to first output unit 113a (for example, output unit 113a(1)). Furthermore, controller 140 causes shift register circuit 121 of input section 120 to simultaneously input, at each of unit time intervals T, each of a plurality of consecutive pieces of unit data in the learning signal data string into each of N input units 111a of input layer 111 on a one-to-one basis. Then, controller 140 controls input section 120 to execute the simultaneous input at each of unit time intervals T such that one of the pieces of unit data input into one of input units 111a (for example, input unit 111a(x)) at one of unit time intervals T (for example, unit time interval T(X)) is input into another of input units 111a (for example, input unit 111a(x+1) immediately after input unit 111a(x)) at another of unit time intervals T (for example, unit time interval T(X+1) immediately after unit time interval T(X)). At this time, input section 120 inputs unit data newly fetched into shift register circuit 121 into first input unit 111a (for example, input unit 111a(1)). Note that X is any integer that meets 1≤x≤(N−1).

FIG. 2 shows an operation example where the learning control processing is sequential processing. Therefore, in the operation example shown in FIG. 2, one cycle of from step S11 to step S17 corresponds to unit time interval T.

This learning control processing allows neural network circuit 110 to acquire capability of generating, from an audio signal data string that is generated through sampling at a relatively low sampling frequency and quantizing with a relatively small quantization bit number and has lost a high-frequency component and a minute-amplitude component, the audio signal data string having the high-frequency component and minute-amplitude component reconstructed.

Note that in the above-described operation example of the learning control processing, M is equal to one.

[1-2-2. Reconstruction Processing]

Figure 3:
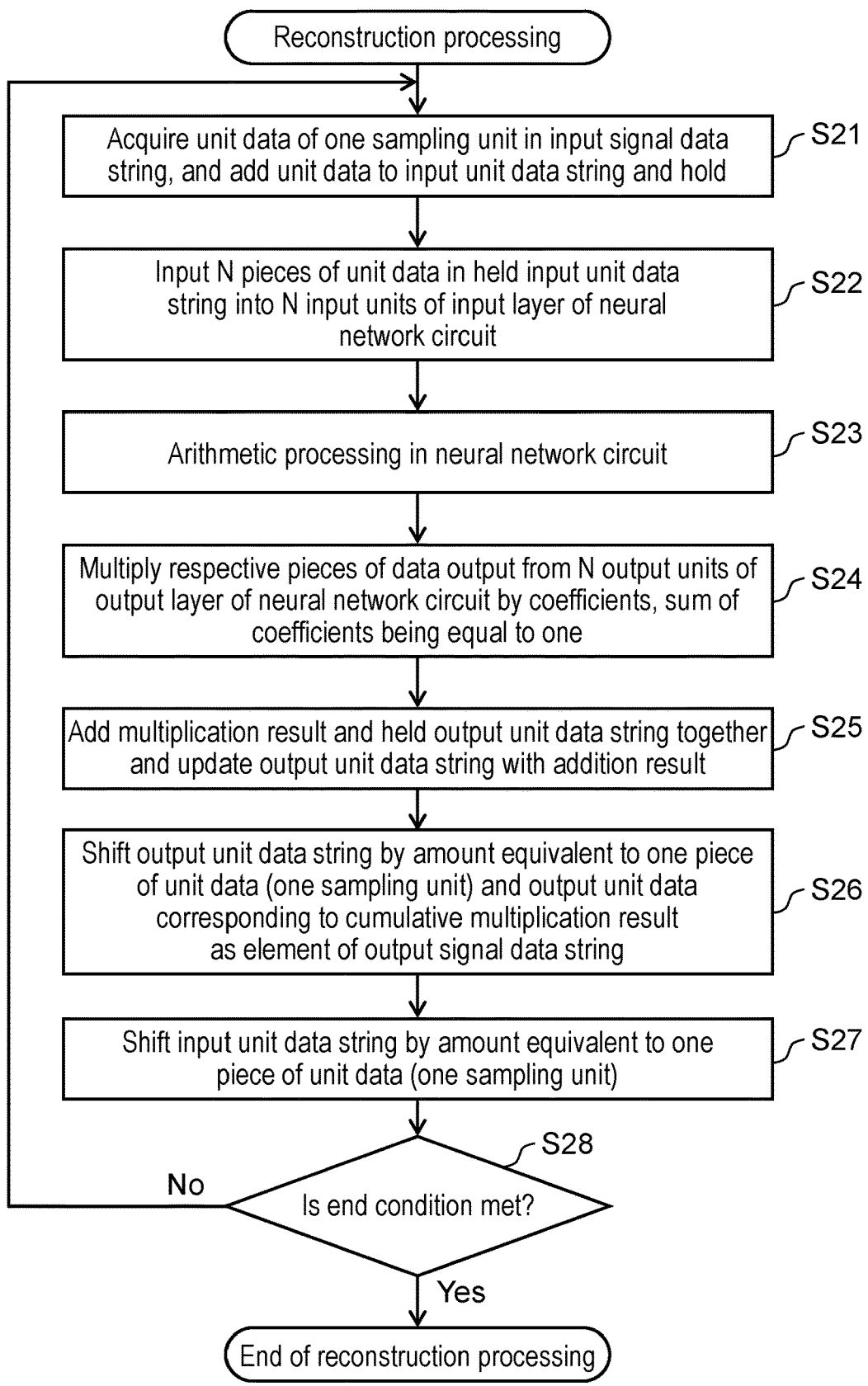
FIG. 3 is a flowchart showing an example of reconstruction processing executed by the audio signal processing device according to the first exemplary embodiment.

FIG. 3 is a flowchart showing an example of the reconstruction processing executed by audio signal processing device 100 according to the first exemplary embodiment. A description will be given below of the reconstruction processing according to the present exemplary embodiment with reference to FIG. 3.

After the completion of the above-described learning control processing, controller 140 of audio signal processing device 100 may notify input section 120 that the reconstruction processing can be started.

Input section 120 of audio signal processing device 100 acquires, via converter 150, unit data ([[n-bit]]k-bit data) of one sampling unit in an input signal data string subject to the reconstruction processing, and adds the unit data thus acquired to an input unit data string in shift register circuit 121 to hold the unit data (step S21).

Input section 120 inputs each of N pieces of unit data in the input unit data string held in shift register circuit 121 into each of N input units 111a of input layer 111 of neural network circuit 110 on a one-to-one basis (step S22). This configuration causes each of N pieces of unit data acquired last (N pieces of unit data in an order opposite to the acquisition order) in the input signal data string acquired by input section 120 to be simultaneously input into N input units 111a of input layer 111.

Audio signal processing device 100 causes neural network circuit 110 to execute computation processing (step S23).

Weights used by units in neural network circuit 110 (weights connecting units between layers) have been already updated through the above-described learning control processing. Accordingly, this computation processing may cause neural network circuit 110 to output data that have a high-frequency component and a minute-amplitude component reconstructed, the high-frequency component and the minute-amplitude component having been lost from the input signal data string. Output section 130 executes processing for reducing distortion and noise on output from neural network circuit 110.

Multiplier circuit 131 of output section 130 multiplies N pieces of k-bit data output from N output units 113a of output layer 113 of neural network circuit 110 by coefficients (step S24), a sum of the coefficients being equal to one (for example, each of the coefficients being equal to 1/N). A result of the multiplication is N pieces of k-bit data.

Adder circuit 132 of output section 130 adds each of N multiplication results from multiplier circuit 131 and each of N output unit data strings (N pieces of k-bit unit data that are newly fetched and of which initial data value is zero) held in shift register circuit 133 together. Then, adder circuit 132 returns a result of the addition to shift register circuit 133. Accordingly, output section 130 updates N output unit data strings held in shift register circuit 133 (step S25).

Step S24 executed by multiplier circuit 131 and step S25 executed by adder circuit 132 (cumulative multiplication in which the multiplication result from multiplier circuit 131 is cumulatively added by adder circuit 132) causes shift register circuit 133 to hold a cumulative multiplication result as an output unit data string.

Next, output section 130 shifts the output unit data string (output unit data string including N pieces of unit data) held in shift register circuit 133 by an amount equivalent to one piece of unit data (one sampling unit). Output section 130 outputs unit data pushed out from the output unit data string (shift register circuit 133) due to the shift as an element of the output signal data string (step S26).

Next, input section 120 shifts data (input unit data string including N pieces of unit data) held in shift register circuit 121 by an amount equivalent to one piece of unit data (one sampling unit) (step S27).

Audio signal processing device 100 determines whether a reconstruction processing end condition is met (step S28). The reconstruction processing end condition is, for example, completion of all processing on the input signal data string.

In step S28, when determining that the reconstruction processing end condition is met, audio signal processing device 100 terminates the reconstruction processing.

In step S28, when determining that the reconstruction processing end condition is not met, audio signal processing device 100 repeats steps S21 to S27 until the reconstruction processing end condition is met.

Note that FIG. 3 only shows an example of procedures for the reconstruction processing. An execution order of the procedures for the reconstruction processing may be changed, and a plurality of the procedures may be executed in parallel.

Audio signal processing device 100 executes the reconstruction processing by using learned neural network circuit 110. Audio signal processing device 100 causes shift register circuit 121 of input section 120 to simultaneously input, at each of unit time intervals T, each of a plurality of consecutive pieces of unit data in the input signal data string into each of N input units 111a of input layer 111 on a one-to-one basis. Then, input section 120 executes the simultaneous input at each of unit time intervals T such that one of the pieces of unit data input into one of input units 111a (for example, input unit 111a(x)) at one of unit time intervals T (for example, unit time interval T(X)) is input into another of input units 111a (for example, input unit 111a(x+M) after input unit 111a(x)) at another of unit time intervals T (for example, unit time interval T(X+1) immediately after unit time interval T(X)). Note that X is any integer that meets 1≤x≤(N−M). At this time, input section 120 inputs M pieces of unit data newly fetched into shift register circuit 121 into first M input units 111a (for example, input unit 111a(1) to input unit 111a(M)). Then, audio signal processing device 100 outputs, in accordance with the simultaneous inputting over a plurality of unit time intervals T that are consecutive, a computation result (M pieces of data after cumulative multiplication) as an element of the output signal data string at each of unit time intervals T, the computation result being based on pieces of data output from N output units 113a of output layer 113 at each of the plurality of unit time intervals T.

FIG. 3 shows an operation example where the reconstruction processing is sequential processing. Therefore, in the operation example shown in FIG. 3, one cycle of from step S21 to step S27 corresponds to the above-described unit time interval T.

[1-3. Effects and Others]

In the present exemplary embodiment, audio signal processing device 100 is an example of the audio signal processing device. Input layer 111 is an example of the input layer. Intermediate layer 112a and intermediate layer 112b are each an example of the intermediate layer. Output layer 113 is an example of the output layer. Neural network circuit 110 is an example of the neural network circuit. Input section 120 is an example of the input section. Input unit 111a is an example of the input unit. Output section 130 is an example of the output section. Output unit 113a is an example of the output unit. Shift register circuit 121 is an example of the first shift register circuit. Shift register circuit 133 is an example of the second shift register circuit. Multiplier circuit 131 is an example of the multiplier circuit. Adder circuit 132 is an example of the adder circuit. Controller 140 is an example of the controller. Shift register circuit 141 is an example of the third shift register circuit. The first sampling frequency is, for example, 88.2 kHz. The second sampling frequency is, for example, 44.1 kHz. The first quantization bit number is, for example, 24. The second quantization bit number is, for example, 16.

For example, audio signal processing device 100 described in the present exemplary embodiment includes neural network circuit 110, input section 120, and output section 130. Neural network circuit 110 includes input layer 111 including a plurality of input units 111a, intermediate layer 112a and intermediate layer 112b, and output layer 113 including a plurality of output units 113a. Input section 120 simultaneously inputs, at each of the unit time intervals, each of pieces of unit data of the plurality of consecutive sampling units in the input signal data string generated through sampling based on an audio signal string into each of the plurality of input units 111a on a one-to-one basis. Furthermore, input section 120 executes the simultaneous inputting at each of unit time intervals T such that one of the pieces of unit data input into one of input units 111a at one of unit time intervals T is input into another of input units 111a at another of unit time intervals T. Output section 130 outputs, in accordance with the simultaneous inputting over a plurality of unit time intervals that are consecutive, a computation result at each of the unit time intervals, the computation result being based on pieces of data output from the plurality of output units 113a at each of the plurality of unit time intervals.

Furthermore, in the example described in the present exemplary embodiment, input units 111a of input layer 111 and output units 113a of output layer 113 in audio signal processing device 100 are both N in number (N is an integer equal to or greater than two). Input section 120 includes shift register circuit 121 capable of holding N pieces of unit data as the input unit data string. Shift register circuit 121 fetches M (M is an integer equal to or greater than one and less than N) pieces of unit data from the input signal data string into the input unit data string at each of the unit time intervals, shifts the input unit data string by an amount equivalent to the M pieces of the unit data at each of the unit time intervals, and simultaneously inputs N pieces of unit data in the input unit data string into N input units 111a at each of the unit time intervals. Output section 130 includes shift register circuit 133 capable of holding N pieces of unit data as the output unit data string, multiplier circuit 131 that multiplies respective pieces of data output from N output units 113a by coefficients, and adder circuit 132. Adder circuit 132 adds a result of the multiplication from multiplier circuit 131 and the output unit data string held in shift register circuit 133 together and updates N pieces of unit data in shift register circuit 133 with a result of the addition. Shift register circuit 133 outputs M pieces of unit data from the output unit data string at each of the unit time intervals and shifts the output unit data string by an amount equivalent to M pieces of unit data at each of the unit time intervals. Furthermore, shift register circuit 133 holds, as the output unit data string, the result of the addition acquired by sending N pieces of unit data in the output unit data string to the adder circuit at each of the unit time intervals.

Furthermore, in the example described in the present exemplary embodiment, M is equal to one, and each of the coefficients by which multiplier circuit 131 multiplies respective pieces of data output from N output units 113a is equal to 1/N in audio signal processing device 100.

Furthermore, in the example described in the present exemplary embodiment, audio signal processing device 100 further includes controller 140 that causes neural network circuit 110 to execute learning. Controller 140 includes shift register circuit 141 capable of holding N pieces of unit data as the teacher unit data string. Controller 140 executes control to cause shift register circuit 141 to fetch, from the teacher signal data string resulting from sampling, at the first sampling frequency (for example, 88.2 kHz), and quantizing, with the first quantization bit number (for example, 24 bits), the audio signal string for learning, M pieces of unit data into the teacher unit data string at each of the unit time intervals, shift the teacher unit data string by an amount equivalent to M pieces of unit data at each of the unit time intervals, and feed N pieces of unit data in the teacher unit data string to N output units 113a at each of the unit time intervals. Controller 140 executes control to cause shift register circuit 121 to handle, as the input signal data string, the learning signal data string acquired through sampling at the second sampling frequency (for example, 44.1 kHz) lower than the first sampling frequency and quantizing with the second quantization bit number (for example, 16 bits) less than the first quantization bit number based on the audio signal string for learning, and conversion to be identical in sampling frequency and quantization bit number to the teacher signal data string. Accordingly, controller 140 causes neural network circuit 110 to execute learning.

Furthermore, in the example described in the present exemplary embodiment, neural network circuit 110 is a stacked autoencoder in which autoencoders are stacked in audio signal processing device 100.

Furthermore, in the example described in the present exemplary embodiment, each unit (unit 112aa, unit 112ba) of intermediate layer 112a and intermediate layer 112b executes nonlinear processing in audio signal processing device 100.

In audio signal processing device 100, the audio signal string for learning may be a frequency sweep signal or an amplitude sweep signal.

In audio signal processing device 100 according to the present exemplary embodiment configured as described above, the learning control processing causes neural network circuit 110 to feed the learning signal data string and the teacher signal data string to input layer 111 and output layer 113, respectively, in synchronization with each piece of unit data of one sampling unit. Then, neural network circuit 110 executes learning (updating weights connecting units between layers) to make outputs from output layer 113 in accordance with content fed to input layer 111 based on the learning signal data string close to outputs corresponding to a target fed to output layer 113 based on the teacher signal data string. The learning signal data string corresponds to an audio signal data string that is generated through sampling at a relatively low sampling frequency (for example, 44.1 kHz) and quantizing with a relatively small bit number (for example, 16 bits) based on the audio signal string for learning and have lost a high-frequency component exceeding the Nyquist frequency (a half of the sampling frequency) and a minute-amplitude component. The teacher signal data string corresponds to an audio signal data string that is generated through sampling at a relatively high sampling frequency (for example, 88.2 kHz) and quantizing with a relatively large bit number (for example, 24 bits) based on the audio signal string for learning and has not relatively lost a high-frequency component and a minute-amplitude component. Therefore, this learning allows neural network circuit 110 to acquire capability of generating, from an audio signal data string that has lost a high-frequency component due to sampling and a minute-amplitude component due to quantization, an audio signal data string having the high-frequency component and minute-amplitude component reconstructed.

Furthermore, in the audio signal processing device 100, shift register circuit 121 and shift register circuit 141 are shifted in synchronization with each other in the learning control processing. Furthermore, each of pieces of unit data of one sampling unit in the learning signal data string and each of pieces of corresponding unit data of one sampling unit in the teacher signal data string are fed into different input units 111a of input layer 111 and different output units 113a of output layer 113, respectively, a plurality of times. This configuration allows neural network circuit 110 to efficiently execute learning.

Furthermore, in audio signal processing device 100, each piece of unit data in the input signal data string is shifted by shift register circuit 121 in the reconstruction processing, which causes each piece of unit data to be input into input layer 111 of neural network circuit 110 at a plurality of different timings. Data reflecting each piece of unit data simultaneously input into input layer 111 is output from output layer 113. Furthermore, data reflecting one piece of unit data input into input layer 111 at a plurality of different timings is output from output layer 113 at a plurality of different timings. A result of cumulative multiplication based on data output from output layer 113 at the plurality of different timings (a result from adder circuit 132 that cumulates a result of multiplication from multiplier circuit 131) may result in data with less noise component influence. This is why the noise component may be reduced by the cumulative multiplication because it is assumed that the noise component is random at each moment and is contained in each piece of unit data in the input signal data string as a random value. Furthermore, distortion in the output from neural network circuit 110 that executes the nonlinear processing (that is, a nonlinear function is used as the activation function) may be reduced by the cumulative multiplication executed by multiplier circuit 131 and adder circuit 132. This allows audio signal processing device 100 to output an output signal data string that contains less distortion and noise and have a high-frequency component and a minute-amplitude component reconstructed, the high-frequency component and the minute-amplitude component having been lost from the input signal data string. Therefore, when a reproduction device (for example, an audio apparatus) that reproduces sound from a signal data string associated with an audio signal reproduces sound based on the output signal data string output from audio signal processing device 100, the sound thus reproduced may be of high quality compared to when sound is reproduced from the input signal data string input into audio signal processing device 100.

Other Exemplary Embodiments

The first exemplary embodiment has been described above as an example of the technique disclosed in the present application. However, the technique in the present disclosure is not limited to the first exemplary embodiment and is also applicable to exemplary embodiments subjected to alteration, replacement, addition, omission, or the like. In addition, new exemplary embodiments can be made by combining constituent elements described in the first exemplary embodiment.

Other exemplary embodiments are therefore described hereinafter.

(1) In the first exemplary embodiment, 88.2 kHz as an example of the first sampling frequency, 24 as an example of the first quantization bit number, 44.1 kHz as an example of the second sampling frequency, and 16 as an example of the second quantization bit number have been given. However, the present disclosure is not limited to these values, and these values may be any other values.

(2) In the first exemplary embodiment, a configuration example where audio signal processing device 100 includes shift register circuit 121, shift register circuit 133, and shift register circuit 141 has been given. However, the present disclosure is by no means limited to the configuration example. For example, a function equivalent to the function of each of the above-described shift register circuits may be implemented by a configuration where audio signal processing device 100 includes a memory and a processor that executes a control program stored in the memory, and the processor handles a plurality of pieces of unit data located at any addresses of the memory as strings (the input unit data string, the teacher unit data string, the output unit data string) and executes an operation such as a shift. Furthermore, a function equivalent to the function of multiplier circuit 131 and the function of adder circuit 132 may be implemented by a configuration where audio signal processing device 100 includes a memory and a processor that executes a control program stored in the memory, and the processor executes computation processing relating to the cumulative multiplication. Furthermore, various functions (for example, a function for executing the audio signal processing) may be implemented by dedicated hardware (for example, a digital circuit or an analog circuit) rather than by software that causes a processor to execute a control program stored in a memory in audio signal processing device 100.

(3) In the first exemplary embodiment, a configuration example where neural network circuit 110 includes two intermediate layers (refer to FIG. 1) has been given. However, this configuration is merely an example, and the present disclosure is by no means limited to this configuration example. An internal configuration of neural network circuit 110 (a number of intermediate layers, a number of units, a computation system, and the like) can be changed from the configuration example shown in FIG. 1 to any desired configuration. Furthermore, in the first exemplary embodiment, a configuration example where each unit of the intermediate layer uses the hyperbolic tangent function as the activation function has been given, but the present disclosure is by no means limited to this configuration example. Each unit of the intermediate layer may use a function other than the hyperbolic tangent function.

(4) In the first exemplary embodiment, a configuration example where shift register circuit 121, shift register circuit 133, and shift register circuit 141 shift held data by an amount equivalent to unit data of one sampling unit at each of unit time intervals T in the learning control processing (refer to FIG. 2) and the reconstruction processing (refer to FIG. 3) has been given. However, the present disclosure is by no means limited to this configuration example. Each of the shift register circuits may shift held data by an amount equivalent to M pieces of unit data at each of unit time intervals T. M is any natural number that is less than N. Note that N denotes respective numbers of units of input layer 111 and output layer 113 of neural network circuit 110. For example, in a case where each of the shift register circuits is configured to shift held data by an amount equivalent to M pieces of data at each of unit time intervals T, shift register circuit 121 and shift register circuit 141 newly fetch M pieces of unit data at each of unit time intervals T. Furthermore, shift register circuit 133 fetches M pieces of unit data of which initial value is zero at each of unit time intervals T and outputs M pieces of unit data pushed out from shift register circuit 133 as an element of the output signal data string. Note that, in audio signal processing device 100, a value of M indicating the shift amount of each of the shift register circuits may differ between when neural network circuit 110 executes learning and when neural network circuit 110 executes different processing (processing relating to reconstruction).

(5) In the first exemplary embodiment, a configuration example where multiplier circuit 131 multiplies respective pieces of data output from output units 113a of output layer 113 by the same coefficient (for example, 1/N) in the reconstruction processing (refer to FIG. 3) has been given. However, for example, in a case where shift register circuit 133 shifts held data by an amount equivalent to M pieces of data at each of unit time intervals, the coefficient may be, for example, M/N. Furthermore, each coefficient by which respective pieces of data output from output units 113a of output layer 113 is multiplied need not be the same value and may be optionally adjusted. For example, a coefficient applied to output unit 113a located near a center of an arrangement of N output units 113a of output layer 113 of neural network circuit 110 may be relatively larger. A coefficient may be specified by applying a window function to this arrangement (order) of output units 113a. Examples of the window function include a hanning window and a hamming window.

(6) In the first exemplary embodiment, a configuration example where audio signal processing device 100 causes controller 140 to execute the learning control processing for learning of neural network circuit 110 has been given. However, the present disclosure is by no means limited to this configuration example. For example, audio signal processing device 100 may be configured to neither include any constituent element for learning nor execute the learning control processing. In such a configuration, audio signal processing device 100 may acquire, from the outside, information or the like on weights connecting units between layers of neural network circuit 110 that results from learning through the learning control processing as described in first exemplary embodiment. Then, audio signal processing device 100 may transmit the information thus acquired to neural network circuit 110 to bring neural network circuit 110 into a state equivalent to a state after learning. Alternatively, audio signal processing device 100 may be manufactured such that neural network circuit 110 is brought into the state equivalent to the state after learning in advance during the manufacturing.

(7) In the first exemplary embodiment, a configuration example where audio signal processing device 100 causes output section 130 to output the output signal data string has been given. However, the present disclosure is by no means limited to this configuration example. For example, audio signal processing device 100 may include a reproduction device that outputs an audio signal string or sound based on output from output section 130.

(8) The constituent elements (functional blocks) of audio signal processing device 100 described in the first exemplary embodiment may be individually packaged on one chip of a semiconductor integrated circuit such as an integrated circuit (IC) or a large scale integration (LSI), or some or all of the constituent elements may be packaged on one chip. Alternatively, some or all of the constituent elements may be configured with one chip of a system LSI on which a memory into which a control program is stored, a microprocessor that executes the control program, and a plurality of components including a circuit that executes part of signal processing are integrated. Furthermore, the circuit integration technique is not limited to the LSI, but the respective circuits of the functional blocks may be configured with a dedicated circuit or a general-purpose processor. A field programmable gate array (FPGA) in which a circuit configuration is programmable after LSI fabrication or a reconfigurable processor in which connections and settings of circuit cells in an LSI are reconfigurable may be used. Alternatively, when the progress of semiconductor technology or other derivative technologies result in the emergence of a circuit integration technology that replaces LSI, the functional blocks may be integrated using the circuit integration technology. For example, a biotechnology can be applied to such a technology.

(9) All or some of various processes described in the first exemplary embodiment (for example, the procedures and the like shown in FIG. 2 and FIG. 3) may be implemented by hardware such as an electronic circuit or by software. Alternatively, a configuration that includes a semiconductor memory card or a single module that is detachably attached to the computer or the signal processing device may be employed. Note that processing based on software is achieved by a control program stored in a memory, which is executed by a processor included in audio signal processing device 100. Furthermore, the control program may be distributed while recorded in a computer-readable or signal processing device-readable recording medium (for example, an optical disk, a magnetic disk, a magnetic tape, or a semiconductor memory). Alternatively, the control program may be transmitted through, for example, a telecommunication line, a wireless or wired communication line, a network such as the Internet, and data broadcasting. For example, the control program thus distributed is installed in the audio signal processing device, and the processor of the audio signal processing device executes the control program, which allows the audio signal processing device to execute various pieces of processing (procedures and the like of the audio signal processing shown in FIG. 2 and FIG. 3). Alternatively, another computer system that is stand-alone may execute the control program to execute various pieces of processing. The audio signal processing executable by a processor that executes the control program includes, for example, input processing and output processing. The input processing is processing for simultaneously inputting, at each of the unit time intervals, each of pieces of unit data of the plurality of consecutive sampling units in the input signal data string into each of the plurality of input units of the input layer of the neural network circuit on a one-to-one basis such that one of the pieces of unit data input into one of the input units at one of the unit time intervals is input into another of the input units at another of the unit time intervals. Furthermore, the output processing is processing for outputting, in accordance with the simultaneous inputting over a plurality of unit time intervals that are consecutive, a computation result as an element of the output signal data string at each of the unit time intervals, the computation result being based on pieces of data output from the plurality of output units of the output layer of the neural network circuit at each of the plurality of unit time intervals.

(10) Another exemplary embodiment implemented by any combination of the constituent elements and the functions described in the first exemplary embodiment is also within the scope of the present disclosure.

Each piece of processing (each function) described in the first exemplary embodiment may be implemented by centralized processing executed by a single device (system) or distributed processing executed by a plurality of devices.

The exemplary embodiments have been described as examples of the technique in the present disclosure. The accompanying drawings and the detailed description have been provided for this purpose.

Accordingly, the constituent elements illustrated and described in the accompanying drawings and the detailed description may include not only the constituent elements that are essential for solving the problems, but also the constituent elements that are not essential for solving the problems in order to illustrate the above technique. Thus, it should not be immediately deemed that, merely based on the fact that the constituent elements that are not essential are shown in the accompanying drawings and described in the detailed description, the components that are not essential are essential.

The above exemplary embodiment is provided to exemplify the technique according to the present disclosure, and thus various changes, replacements, additions, omissions, and the like can be made within the scope of the claims and equivalents thereof.

INDUSTRIAL APPLICABILITY

The present disclosure is applicable to an audio signal processing device and an audio signal processing method that process audio signal data generated through sampling and the like based on an audio signal.

REFERENCE MARKS IN THE DRAWINGS

100: audio signal processing device
110: neural network circuit
111: input layer
111a: input unit
112a, 112b: intermediate layer
112aa, 112ba: intermediate unit
113: output layer
113a: output unit
120: input section
121: shift register circuit
130: output section
131: multiplier circuit
132: adder circuit
133: shift register circuit
140: controller
141: shift register circuit
150: converter

The invention claimed is:
1. An audio signal reproducing device for outputting an output signal data string in accordance with an input signal data string, comprising:
a neural network circuit including:
an input layer including a plurality of input units,
an intermediate layer, and
an output layer including a plurality of output units;
an input section that executes simultaneous inputting of, at each of unit time intervals, each of pieces of unit data of a plurality of consecutive sampling units in the input signal data string generated through sampling based on an audio signal string into each of the plurality of input units on a one-to-one basis, wherein one of the pieces of unit data input into one of the plurality of input units at one of the unit time intervals is input into another of the plurality of input units at another of the unit time intervals in the simultaneous inputting at each of the unit time intervals; and
an output section that outputs, in accordance with the simultaneous inputting over a plurality of the unit time intervals that are consecutive, a computation result, as the output audio signal, at each of the unit time intervals, the computation result being based on pieces of data output from the plurality of output units at each of the plurality of unit time intervals, wherein:
the plurality of input units of the input layer and the plurality of output units of the output layer are both N in number, N being an integer equal to or greater than two,
the input section includes a first shift register circuit for holding N pieces of unit data as an input unit data string,
the first shift register circuit fetches M pieces of unit data from the input signal data string into the input unit data string at each of the unit time intervals, M being an integer that is equal to or greater than one and less than N, shifts the input unit data string by an amount equivalent to M pieces of unit data at each of the unit time intervals, and executes simultaneous inputting of N pieces of unit data in the input unit data string into N input units at each of the unit time intervals, the N input units being the plurality of input units,
the output section includes:
a second shift register circuit for holding N pieces of unit data as an output unit data string,
a multiplier circuit that multiplies respective pieces of data output from N output units by coefficients, the N output units being the plurality of output units, and
an adder circuit that adds a result of multiplication from the multiplier circuit and the output unit data string held in the second shift register circuit together and updates N pieces of unit data in the second shift register circuit with a result of the addition, and
the second shift register circuit outputs M pieces of unit data from the output unit data string at each of the unit time intervals, shifts the output unit data string by an amount equivalent to M pieces of unit data at each of the unit time intervals, and holds the result of the addition as the output unit data string, the result of the addition being acquired by sending N pieces of unit data in the output unit data string to the adder circuit at each of the unit time intervals, and the audio signal reproducing device is configured to reconstruct, in the output signal data string, a high-frequency component and a minute-amplitude component that have been lost from the audio signal strings of the input signal by the sampling, based on the output unit data string output from the second shift register circuit.

2. The audio signal reproducing device according to claim 1, wherein:

M is equal to one, and each of the coefficients by which the multiplier circuit multiplies respective pieces of data output from the N output units is equal to 1/N.

3. The audio signal reproducing device according to claim 1, further comprising a controller that executes control to cause the neural network circuit to execute learning, wherein:

the controller includes a third shift register circuit capable of holding N pieces of unit data as a teacher unit data string, and the controller executes control to cause the neural network circuit to execute learning by executing control to cause the third shift register circuit to:

fetch, into the teacher unit data string at each of the unit time intervals, M pieces of unit data from a teacher signal data string, wherein the teacher signal data string is obtained by sampling at a first sampling frequency and quantizing with a first quantization bit number, based on an audio signal string for learning, shift the teacher unit data string by an amount equivalent to M pieces of unit data at each of the unit time intervals, and feed N pieces of unit data in the teacher unit data string to the N output units at each of the unit time intervals, and executing control to cause the first shift register circuit to use as the input signal data string, a learning signal data string acquired through sampling at a second sampling frequency lower than the first sampling frequency, quantizing with a second quantization bit number less than the first quantization bit number based on the audio signal string for learning, and converting the input signal to be identical in sampling frequency and quantization bit number to the teacher signal data string.

4. The audio signal reproducing device according to claim 3, wherein the neural network circuit is a stacked autoencoder in which autoencoders are stacked.

5. The audio signal reproducing device according to claim 1, wherein units of the intermediate layer each execute nonlinear processing.

6. An audio reproducing method executed by an audio reproducing device for outputting an output signal data string in accordance with an input signal data string generated through sampling based on an audio signal string by using a neural network circuit that includes an input layer including a plurality of input units, an intermediate layer, and an output layer including a plurality of output units, the audio signal processing method comprising:

executing simultaneous inputting of, at each of unit time intervals, each of pieces of unit data of a plurality of consecutive sampling units in the input signal data string into each of the plurality of input units on a one-to-one basis, wherein one of the pieces of unit data input into one of the plurality of input units at one of the unit time intervals is input into another of the plurality of input units at another of the unit time intervals in the simultaneous inputting at each of the unit time intervals;

outputting, in accordance with the simultaneous inputting over a plurality of the unit time intervals that are consecutive, a computation result at each of the unit time intervals as an element of the output signal data string, the computation result being based on pieces of data output from the plurality of output units at each of the plurality of unit time intervals; and causing the neural network circuit to execute learning:

executing simultaneous feed of, at each of the unit time intervals, each of pieces of unit data of a plurality of consecutive sampling units in a teacher signal data string resulting from sampling, at a first sampling frequency, and quantizing, with a first quantization bit number, based on an audio signal string for learning, to each of the plurality of output units on a one-to-one basis, wherein one of the pieces of unit data fed to one of the plurality of output units at one of the unit time intervals is fed to another of the plurality of output units at another of the unit time intervals in the simultaneous feed at each of the unit time intervals; and executing simultaneous inputting of, at each of the unit time intervals, each of pieces of unit data of a plurality of consecutive sampling units in a learning signal data string acquired through sampling at a second sampling frequency lower than the first sampling frequency and quantizing with a second quantization bit number less than the first quantization bit number based on the audio signal string for learning, and conversion to be identical in sampling frequency and quantization bit number to the teacher signal data string into each of the plurality of input units on a one-to-one basis, wherein:

one of the pieces of unit data input into one of the plurality of input units at one of the unit time intervals is input into another of the plurality of input units at another of the unit time intervals in the simultaneous inputting at each of the unit time intervals, and in the output signal data string, a high-frequency component and a minute-amplitude component that have been lost from the audio signal strings by the sampling are reconstructed by the audio reproducing device based on an output from the neural network circuit.

7. The audio signal reproducing method according to claim 6, wherein the audio signal string for learning is a frequency sweep signal or an amplitude sweep signal.

8. A non-transitory computer-readable recording medium storing a control program to be executed by an audio reproducing device for performing audio signal reproducing for outputting an output signal data string in accordance with an input signal data string generated through sampling based on an audio signal string by using a neural network circuit that includes an input layer including a plurality of input units, an intermediate layer, and an output layer including a plurality of output units, the audio signal processing including:

executing simultaneous inputting of, at each of unit time intervals, each of pieces of unit data of a plurality of consecutive sampling units in the input signal data string into each of the plurality of input units on a one-to-one basis, wherein one of the pieces of unit data input into one of the plurality of input units at one of the unit time intervals is input into another of the plurality of input units at another of the unit time intervals in the simultaneous inputting at each of the unit time intervals;

outputting, in accordance with the simultaneous inputting over a plurality of the unit time intervals that are consecutive, a computation result at each of the unit time intervals as an element of the output signal data string, the computation result being based on pieces of data output from the plurality of output units at each of the plurality of unit time intervals; and causing the neural network circuit to execute learning:

executing simultaneous feed of, at each of the unit time intervals, each of pieces of unit data of a plurality of consecutive sampling units in a teacher signal data string resulting from sampling, at a first sampling frequency, and quantizing, with a first quantization bit number, based on an audio signal string for learning, to each of the plurality of output units on a one-to-one basis, wherein one of the pieces of unit data fed to one of the plurality of output units at one of the unit time intervals is fed to another of the plurality of output units at another of the unit time intervals in the simultaneous feed at each of the unit time intervals; and executing simultaneous inputting of, at each of the unit time intervals, each of pieces of unit data of a plurality of consecutive sampling units in a learning signal data string acquired through sampling at a second sampling frequency lower than the first sampling frequency and quantizing with a second quantization bit number less than the first quantization bit number based on the audio signal string for learning, and conversion to be identical in sampling frequency and quantization bit number to the teacher signal data string into each of the plurality of input units on a one-to-one basis, wherein:

one of the pieces of unit data input into one of the plurality of input units at one of the unit time intervals is input into another of the plurality of input units at another of the unit time intervals in the simultaneous inputting at each of the unit time intervals, and in the output signal data string, a high-frequency component and a minute-amplitude component that have been lost from the audio signal strings by the sampling are reconstructed by the audio reproducing device based on an output from the neural network circuit.

* * * * *